(12) United States Patent
Manabe et al.

(10) Patent No.: US 7,943,262 B2
(45) Date of Patent: May 17, 2011

(54) FUEL CELL SYSTEM

(75) Inventors: Kota Manabe, Toyota (JP); Tomoya Ogawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 60 days.

(21) Appl. No.: 12/525,628

(22) PCT Filed: Apr. 16, 2008

(86) PCT No.: PCT/JP2008/057788
§ 371 (c)(1),
(2), (4) Date: Aug. 3, 2009

(87) PCT Pub. No.: WO2008/130047
PCT Pub. Date: Oct. 30, 2008

(65) Prior Publication Data
US 2010/0047663 A1 Feb. 25, 2010

(30) Foreign Application Priority Data
Apr. 16, 2007 (JP) .................................. 2007-107292

(51) Int. Cl.
*H01M 8/04* (2006.01)
(52) U.S. Cl. .......................... 429/431; 429/429; 429/444
(58) Field of Classification Search .................. 429/430, 429/452, 401, 432, 429, 431, 444
See application file for complete search history.

(56) References Cited

U.S. PATENT DOCUMENTS

| | | | | |
|---|---|---|---|---|
| 5,482,791 | A * | 1/1996 | Shingai et al. | 429/23 |
| 2002/0018922 | A1 * | 2/2002 | Fuglevand et al. | 429/22 |
| 2004/0115491 | A1 * | 6/2004 | Cargnelli et al. | 429/13 |
| 2006/0251938 | A1 * | 11/2006 | Kamihara | 429/24 |

FOREIGN PATENT DOCUMENTS

| | | |
|---|---|---|
| JP | 2004-172027 A | 6/2004 |
| JP | 2006-073501 A | 3/2006 |
| JP | 2006-100101 A | 4/2006 |
| JP | 2008-060054 A | 3/2008 |
| JP | 2008-108668 A | 5/2008 |
| JP | 2008-125214 | 5/2008 |

OTHER PUBLICATIONS

Machine translation of: JP 2006-100101, Fujita et al., Apr. 2006.*

* cited by examiner

*Primary Examiner* — Jonathan Crepeau
*Assistant Examiner* — Kenneth Douyette
(74) *Attorney, Agent, or Firm* — Kenyon & Kenyon LLP

(57) ABSTRACT

There is disclosed a fuel cell system which can control an output current of a fuel cell even if an error occurs in split flow control of an oxidizing gas. The fuel cell system includes a fuel cell and a feed device for supplying the oxidizing gas under pressure to the fuel cell. A feed channel is connected to a discharge channel by a bypass channel so that the oxidizing gas flows while bypassing the fuel cell. The system includes a regulator valve and a bypass valve which adjust the split flow of the oxidizing gas to the bypass channel and the fuel cell. When the regulator valve or the bypass valve has an error, a controller stops the control of the output current of the fuel cell by control of the regulator valve and switches the control to a control of the output current of the fuel cell by control of the feed device.

10 Claims, 6 Drawing Sheets

$(2H^+ + 2e^- + 1/2O_2 \rightarrow H_2O)$    $(H_2 \rightarrow 2H^+ + 2e^-)$ $(2H^+ + 2e^- \rightarrow H_2)$    $(H_2 \rightarrow 2H^+ + 2e^-)$

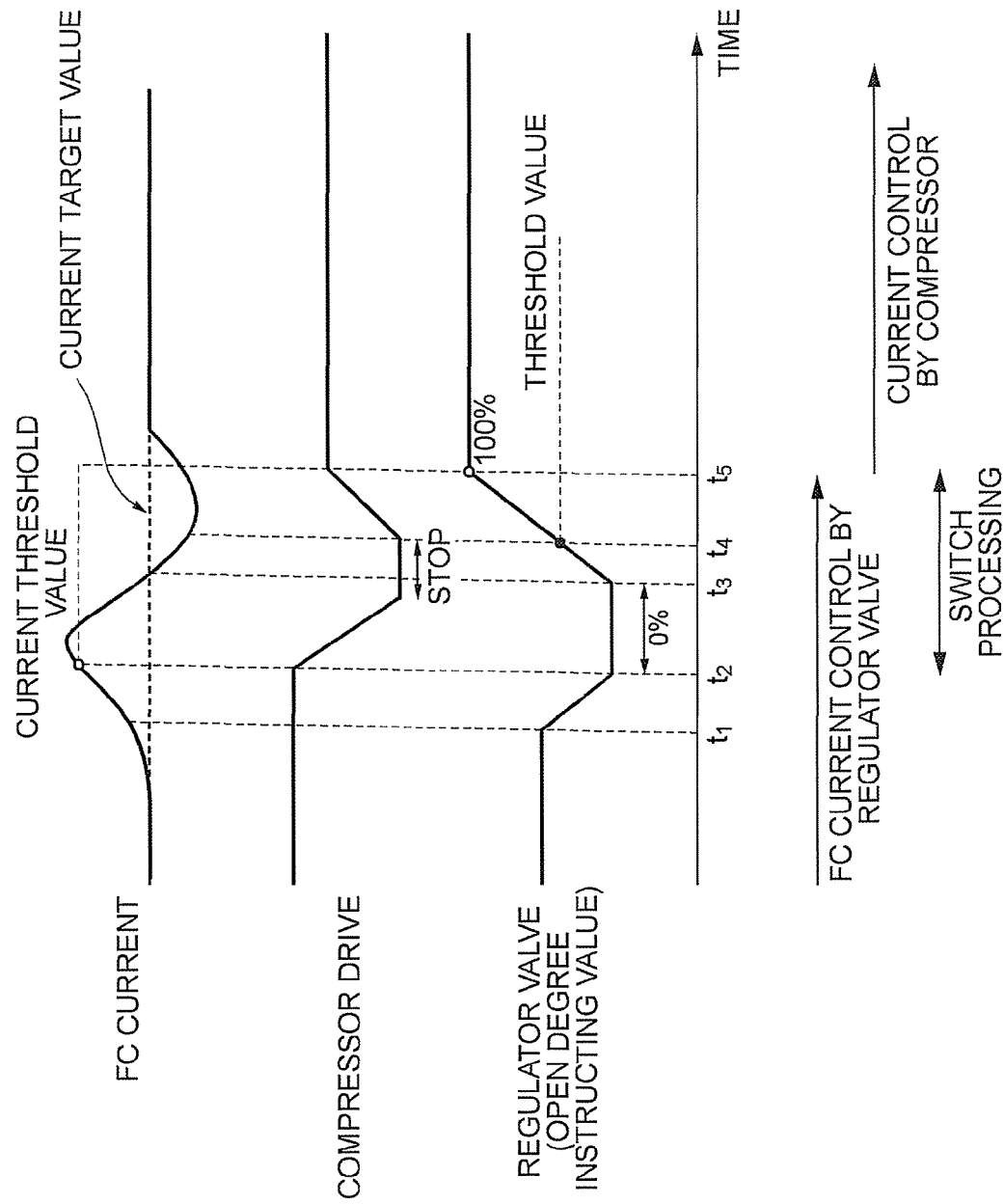

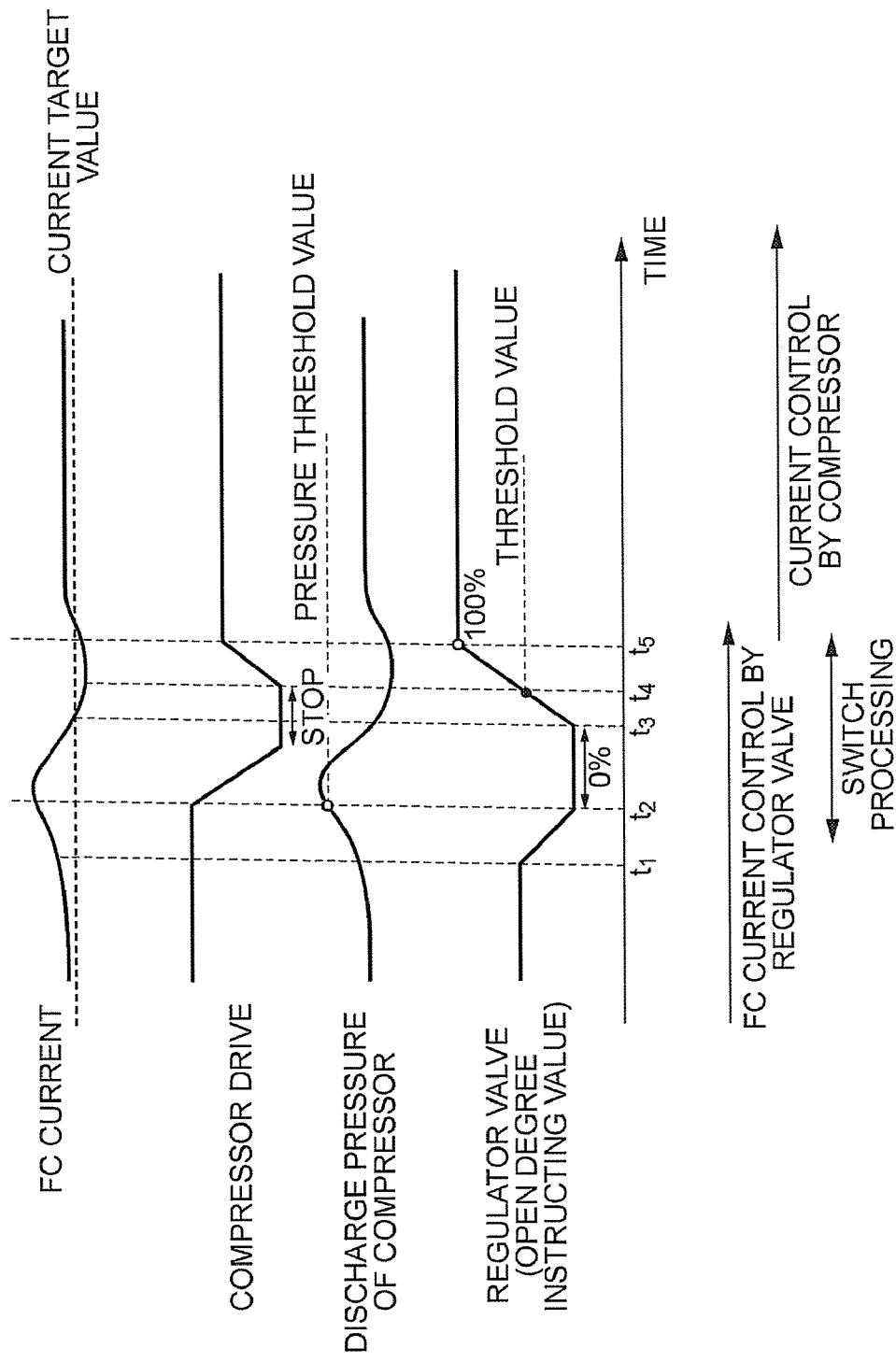

FUEL CELL SYSTEM

This is a 371 national phase application of PCT/JP2008/057788 filed 16 Apr. 2008, which claims priority to Japanese Patent Application No. 2007-107292 filed 16 Apr. 2007, the contents of which are incorporated herein by reference.

TECHNICAL FIELD

The present invention relates to a fuel cell system in which an oxidizing gas can bypass a fuel cell.

BACKGROUND ART

A fuel cell mounted on a fuel cell car or the like generates a power by a chemical reaction between hydrogen in a fuel gas fed to an anode and oxygen in an oxidizing gas fed to a cathode. In general, a fuel off gas discharged from the fuel cell passes through a hydrogen dilution unit, and is discharged to the atmosphere in a state in which a hydrogen concentration is lowered. On the other hand, an oxidizing off gas discharged from the fuel cell is discharged as it is to the atmosphere.

However, in a case where the fuel cell is operated to quickly raise the temperature of the fuel cell while a power generation efficiency is low, hydrogen (mainly pumping hydrogen) is sometimes generated in a cathode. In consequence, hydrogen might be included in the oxidizing off gas. However, the discharging of the oxidizing off gas including hydrogen as it is to the atmosphere is environmentally unfavorable.

In view of such a situation, in a fuel cell system disclosed in Japanese Patent Application Laid-Open No. 2006-73501 (paragraphs [0025] and [0093]), a feed channel of the oxidizing gas is connected to a discharge channel of the oxidizing off gas via a bypass channel. The oxidizing gas is introduced into the oxidizing off gas through the bypass channel such that the concentration of hydrogen in the oxidizing off gas is lowered.

DISCLOSURE OF THE INVENTION

However, in the fuel cell system disclosed in Japanese Patent Application Laid-Open No. 2006-73501, any split flow of an oxidizing gas to a bypass channel and a fuel cell has not been considered. Therefore, the necessary amount of the oxidizing gas does not flow through the fuel cell, and the control of the output current of the fuel cell might be disturbed. Moreover, even if a control valve for the split flow is provided, the extra amount of the oxidizing gas might flow into the fuel cell to disturb the control of the output current, in a case where the control valve does not operate for a reason such as freezing.

An object of the present invention is to provide a fuel cell system which can control the output current of a fuel cell even if an error occurs in the split flow control of an oxidizing gas.

To achieve the above object, the fuel cell system of the present invention comprises: a fuel cell; a feed channel through which an oxidizing gas to be fed to the fuel cell flows; a feed device provided in the feed channel to feed the oxidizing gas under pressure to the fuel cell; a discharge channel through which an oxidizing off gas to be discharged from the fuel cell flows; a bypass channel which connects the feed channel to the discharge channel so that the oxidizing gas flows while bypassing the fuel cell; split flow adjustment means for adjusting the split flow of the oxidizing gas to the bypass channel and the fuel cell; and a controller which controls the feed device and the split flow adjustment means. When the split flow adjustment means has an error, the controller switches the control of the output current of the fuel cell from a control by the split flow adjustment means to a control by the control of the feed device.

According to such a constitution, during a normal operation, the split flow adjustment means can adjust the split flow of the oxidizing gas to the bypass channel and the fuel cell and can control the output current of the fuel cell. On the other hand, if the error occurs in the split flow adjustment means, a device for controlling the output current of the fuel cell is switched to the feed device, so that the output current can continuously be controlled.

Preferably, the controller may switch the control of the output current of the fuel cell from the split flow adjustment means to the feed device, when the error of the split flow adjustment means occurs during a low efficiency operation having a power loss larger than that of a normal operation.

With this constitution, failsafe can be achieved at a time when the error of the split flow adjustment means occurs during the low efficiency operation.

More preferably, the split flow adjustment means may prohibit the split flow of the oxidizing gas to the bypass channel during the normal operation, and may adjust the flow rate of the oxidizing gas to be split to the bypass channel during the low efficiency operation.

With this constitution, during the low efficiency operation, hydrogen in the oxidizing off gas can be diluted by the bypassed oxidizing gas. On the other hand, during the normal operation, the oxidizing gas does not have to bypass the fuel cell, so that the feed of the oxidizing gas to the fuel cell can appropriately be performed.

Preferably, the split flow adjustment means may have a regulator valve which adjusts the feed pressure of the oxidizing gas to the fuel cell, and a bypass valve which adjusts the flow rate of the oxidizing gas to be split from the bypass channel to the discharge channel. Moreover, the controller may switch the control of the output current of the fuel cell from a control by the regulator valve to the control by the feed device, when an error occurs in at least one of the regulator valve and the bypass valve during the low efficiency operation.

With this constitution, even when the error occurs in at least one of the regulator valve and the bypass valve during the low efficiency operation and a defect occurs in the amount of the oxidizing gas to be split to the fuel cell, the output current of the fuel cell can be controlled. In consequence, the low efficiency operation can be maintained.

More preferably, the controller may once stop and then drive the feed device, when switching to the control by the feed device.

With this constitution, when defects occur in the feed flow rate and the feed pressure of the oxidizing gas to the fuel cell owing to the occurrence of the error, the defects can be eliminated by once stopping the feed device. In consequence, the control can smoothly shift to the control of the output current by the feed device.

Here, when the regulator valve has the error in an opened state, an extra amount of the oxidizing gas is fed to the fuel cell, and hence the output current of the fuel cell increases.

Therefore, the fuel cell system of one preferable embodiment includes a current sensor which detects the output current of the fuel cell, and when a value detected by the current sensor exceeds a threshold value, the controller may judge that the error of the regulator valve occurs in the opened state, to once stop the feed device.

With this constitution, it can be judged that the error of the regulator valve is in the opened state, and the judgment of the error state can be used as a trigger to once stop the feed device.

More preferably, the controller performs control by the feedback of the value detected by the current sensor to an open degree instructing value of the regulator valve, and starts the driving of the once stopped feed device, when the open degree instructing value of the regulator valve exceeds a threshold value.

According to such a constitution, the open degree instructing value of the regulator valve can be used as a trigger to start the driving of the feed device.

Here, even when the bypass valve has an error in a closed state instead of the regulator valve, an extra amount of the oxidizing gas having an extra pressure is fed to the fuel cell.

Therefore, the fuel cell system of another preferable embodiment includes a pressure sensor which detects the discharge pressure of the oxidizing gas from the feed device, and when a value detected by the pressure sensor exceeds a threshold value, the controller may judge that the error of the bypass valve occurs in the closed state, to once stop the feed device.

With this constitution, it can be judged that the error of the bypass valve is in the closed state, and the judgment of the error state can be used as the trigger to once stop the feed device.

Preferably, the controller judges by use of different sensors whether the error occurs in the regulator valve or the bypass valve.

With this constitution, as compared with a case where the same sensor is used, it can precisely be judged that the error occurs in the regulator valve or the bypass valve.

Preferably, the regulator valve is provided in the discharge channel, and the bypass valve is provided in the bypass channel.

BRIEF DESCRIPTION OF THE DRAWINGS

FIG. 3A shows a cell reaction during a normal operation, and FIG. 3B shows a cell reaction during a low efficiency operation;

FIG. 5 is a timing chart showing a switching method at a time when the error of a regulator valve according to the embodiment occurs in an opened state; and FIG. 6 is a timing chart showing a switching method at a time when the error of a bypass valve according to the embodiment occurs in a closed state.

BEST MODE FOR CARRYING OUT THE INVENTION

Hereinafter, a fuel cell system according to a preferable embodiment of the present invention will be described with reference to the accompanying drawings.

Figure 1:
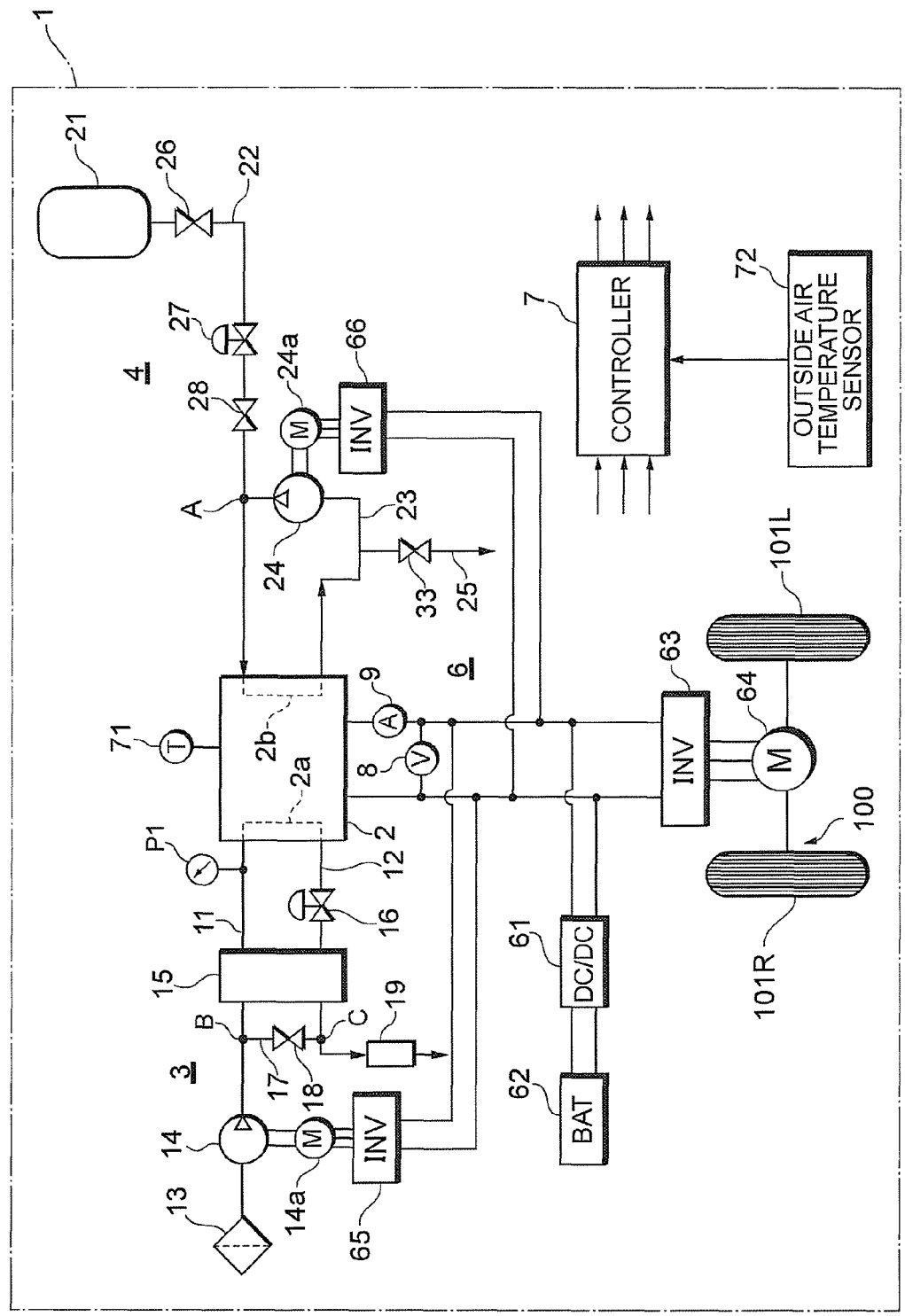
FIG. 1 is a configuration diagram of a fuel cell system according to an embodiment.

As shown in FIG. 1, a fuel cell system 1 includes a fuel cell 2, an oxidizing gas piping system 3, a fuel gas piping system 4, a power system 6, and a controller 7. The fuel cell system 1 can be mounted on a vehicle 100, and needless to say, the system can be applied to not only the vehicle 100 but also various mobile bodies (e.g., a ship, an airplane, a robot, etc.) and a stationary power source.

The fuel cell 2 has a stack structure in which a large number of unitary cells are stacked. Each unitary cell of a solid polymer electrolyte type has an air pole (a cathode) on one face of an electrolyte constituted of an ion exchange membrane, a fuel pole (an anode) on the other face, and further a pair of separators which sandwich the air pole and the fuel pole from both sides. Oxidizing gas is fed to an oxidizing gas passage 2a of one of the separators, and fuel gas is fed to a fuel gas passage 2b of the other separator. By an electrochemical reaction between the fed fuel gas and oxidizing gas, the fuel cell 2 generates a power and also generates heat. The temperature of the solid polymer electrolyte type fuel cell 2 is detected by a temperature sensor 71, and is in a range of about 60 to 80° C.

The output voltage (hereinafter referred to as "the FC voltage") and the output current (hereinafter referred to as "the FC current") of the fuel cell 2 are detected by a voltage sensor 8 and a current sensor 9, respectively. The output power (hereinafter referred to as "the FC output") of the fuel cell 2 is obtained by multiplying the FC voltage by the FC current.

The oxidizing gas piping system 3 has a feed channel 11 and a discharge channel 12. The oxidizing gas to be fed to the oxidizing gas passage 2a flows through the feed channel 11. An oxidizing off gas discharged from the oxidizing gas passage 2a flows through the discharge channel 12. A compressor 14 (a feed device) is provided in the feed channel 11, and takes outside air as the oxidizing gas through an air cleaner 13, to feed the gas under pressure to the fuel cell 2. The oxidizing gas fed under pressure to the fuel cell 2 is subjected to water content exchange between the oxidizing gas and the oxidizing off gas by a humidifier 15, and is adequately humidified. The rotation number of a motor 14a of the compressor 14 is controlled by the controller 7, whereby the discharge amount of the oxidizing gas is controlled. The discharge pressure of the oxidizing gas by the compressor 14 is detected by a pressure sensor P1.

A regulator valve 16 is arranged around a cathode outlet in the discharge channel 12, to adjust the feed pressure of the oxidizing gas to the fuel cell 2. The regulator valve 16 is a control valve where, for example, a stepping motor is a drive source, and the open degree of the valve is set to an arbitrary degree in accordance with a command from the controller 7. A bypass channel 17 connects the feed channel 11 to the discharge channel 12 so that the oxidizing gas flows while bypassing the fuel cell 2. A connecting portion B between the bypass channel 17 and the feed channel 11 is positioned between the compressor 14 and the humidifier 15. Moreover, a connecting portion C between the bypass channel 17 and the discharge channel 12 is positioned between the humidifier 15 and a muffler 19. The oxidizing off gas is finally discharged as an exhaust gas from the system to the atmosphere through the muffler 19.

A bypass valve 18 is provided in the bypass channel 17. The bypass valve 18 is a control valve where a motor, a solenoid or the like is a drive source, and the open degree of the valve is set in accordance with the command from the controller 7. When the bypass valve 18 is opened, a part of the oxidizing gas discharged from the compressor 14 is split to the bypass channel 17, passes through the bypass valve 18, and is introduced to the muffler 19. The amount of the bypassed oxidizing gas is controlled by the controller 7. In the following description, the bypassed oxidizing gas is referred to as "the bypass air".

It is to be noted that "the split flow adjustment means" described in claims will supplementarily be described. It is considered that the bypass valve 18 functions as "the split flow adjustment means" for adjusting the split flow of the oxidizing gas to the bypass channel 17 and the fuel cell 2. This is because when, for example, the bypass valve 18 is closed, the oxidizing gas is split to the bypass channel 17. Moreover, it is considered that the regulator valve 16 also functions as "the split flow adjustment means" for adjusting the split flow of the oxidizing gas to the bypass channel 17 and the fuel cell 2. This is because when the bypass valve 18 is closed and the regulator valve 16 is closed, the bypass air increases.

The fuel gas piping system 4 feeds or discharges a hydrogen gas as the fuel gas to or from the fuel cell 2. The fuel gas piping system 4 has a hydrogen source 21, a feed channel 22, a circulation channel 23, a pump 24, and a purge channel 25. When a source valve 26 is opened, the hydrogen gas is discharged from the hydrogen feed source 21 to the feed channel 22, and fed to the fuel gas passage 2b through a regulator valve 27 and a shutoff valve 28. The hydrogen gas is discharged as a hydrogen off gas from the fuel gas passage 2b to the circulation channel 23. The hydrogen off gas is returned to a joining part A between the circulation channel 23 and the feed channel 22 by the pump 24, and fed again to the fuel gas passage 2b. When a purge valve 33 is appropriately opened, a part of the hydrogen off gas is discharged from the circulation channel 23 to the purge channel 25, and discharged from the system through a hydrogen dilution unit (not shown).

The power system 6 charges or discharges the power of the system 1. DC/DC converter 61 is a direct-current voltage converter. The DC/DC converter 61 has a function of adjusting a direct-current voltage input from a battery 62 to output the voltage to a traction inverter 63, and a function of adjusting the direct-current voltage input from the fuel cell 2 or a traction motor 64 to output the voltage to the battery 62. By the functions of the DC/DC converter 61, the charging and discharging of the battery 62 is realized, and the FC voltage of the fuel cell 2 is controlled. The traction inverter 63 converts a direct current into a three-phase alternate current to supply the current to the traction motor 64. The traction motor 64 constitutes a main power source of the vehicle 100, and is connected to wheels 101L, 101R. Auxiliary device inverters 65 and 66 control the driving of the motor 14a of the compressor 14 and a motor 24a of the pump 24, respectively.

The controller 7 is constituted as a microcomputer including a CPU, an ROM and an RAM therein, and generally controls the system 1. The CPU executes desired calculation in accordance with a control program, and performs various processing and control such as the control of the low efficiency operation as described later. The ROM stores the control program and control data to be processed by the CPU. The RAM is used as various working areas mainly for control processing.

The controller 7 inputs sensor signals from the pressure sensor P1, the voltage sensor 8, the current sensor 9, the temperature sensor 71, an outside air temperature sensor 72 which detects the temperature of an environment where the fuel cell system 1 is disposed, an accelerator pedal sensor which detects the open degree of an accelerator pedal of the vehicle 100 and the like. Moreover, the controller 7 centrically controls system parts (the feed device 14, the back regulator valve 16, the bypass valve 18, etc.) based on the sensor signals. In particular, when there is a need to rapidly warm up the fuel cell 2 during low temperature startup or the like, the controller 7 shifts the operation point of the fuel cell 2 to perform an operation with a low power generation efficiency by use of various maps stored in the ROM.

Figure 2:
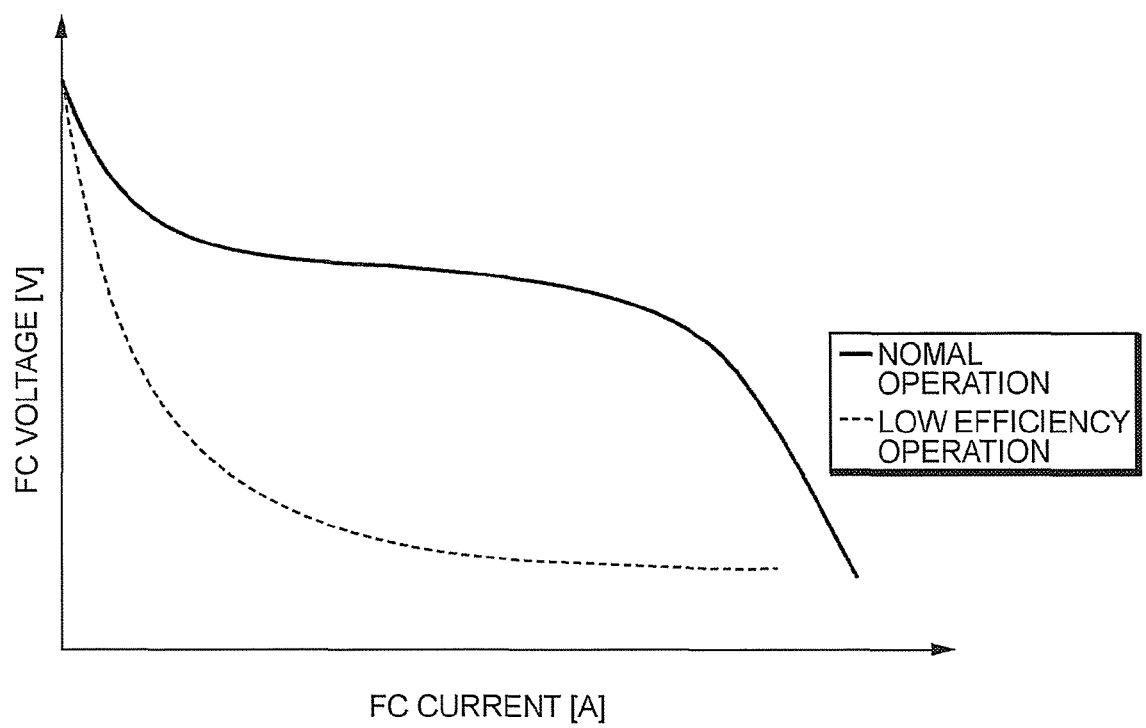
FIG. 2 is a graph showing a relation between an FC current and an FC voltage according to the embodiment.

FIG. 2 is a diagram showing a relation between the FC current and the FC voltage. FIG. 2 shows by a solid line a case where the fuel cell 2 performs an operation (hereinafter referred to as "the nomal operation") with a comparatively high power generation efficiency (the first power generation efficiency), and shows by a dotted line a case where the amount of the oxidizing gas is reduced and the fuel cell 2 performs an operation (hereinafter referred to as "the low efficiency operation") with a comparatively low power generation efficiency (the second power generation efficiency).

To perform the nomal operation of the fuel cell 2, the fuel cell 2 is operated while an air stoichiometric ratio is set to 1.0 or more (a theoretical value), to suppress a power loss and obtain a high power generation efficiency (see the solid line part of FIG. 2). Here, the air stoichiometric ratio is the excessive ratio of an actual air feed amount with respect to a theoretical air feed amount necessary for the power generation of the fuel cell 2.

On the other hand, to warm up the fuel cell 2, the fuel cell 2 is operated while the air stoichiometric ratio is set to a value less than 1.0 (a theoretical value), to increase the power loss and raise the temperature of the fuel cell 2 (see the dotted line part of FIG. 2). When the air stoichiometric ratio is set to a low ratio to perform the low efficiency operation, the oxidizing gas fed to the fuel cell 2 runs short, and hence as to energy which can be taken by a reaction between hydrogen and oxygen, energy to compensate for the power loss (i.e., thermal loss) is positively increased. In consequence, the temperature of the fuel cell 2 can be raised in a short time as compared with the nomal operation. However, when the low efficiency operation is performed, pumping hydrogen is generated in the cathode of the fuel cell 2.

Figure 3A:
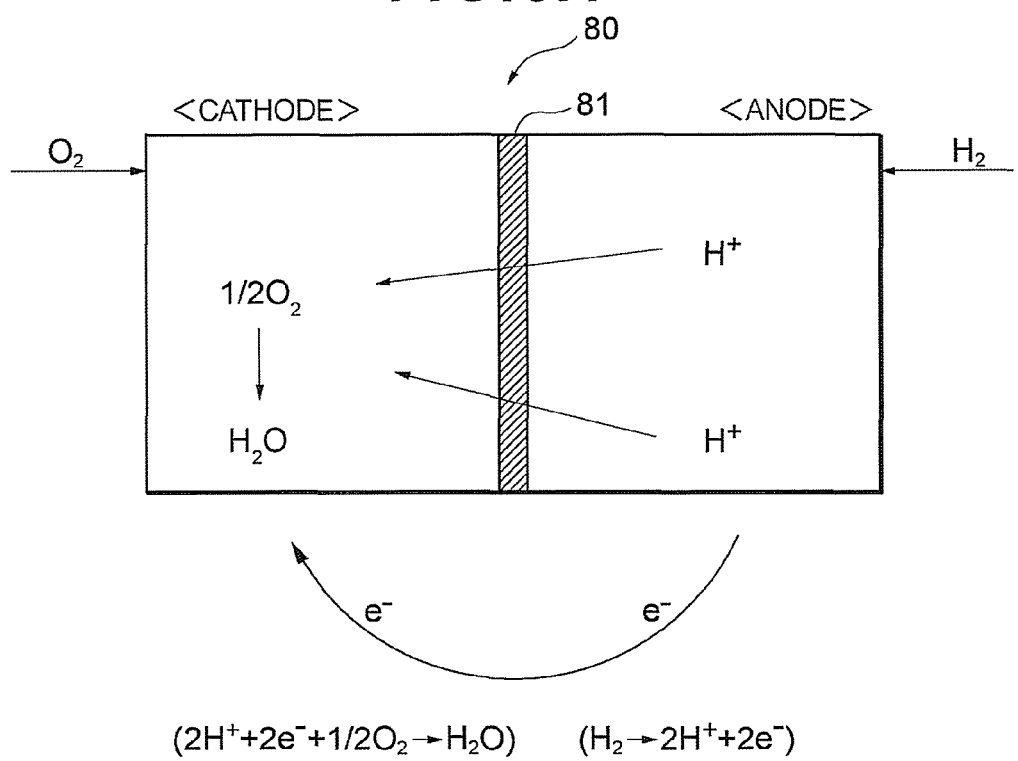
FIGS. 3A and 3B are diagrams for explaining the generation mechanism of pumping hydrogen.
Figure 3B:
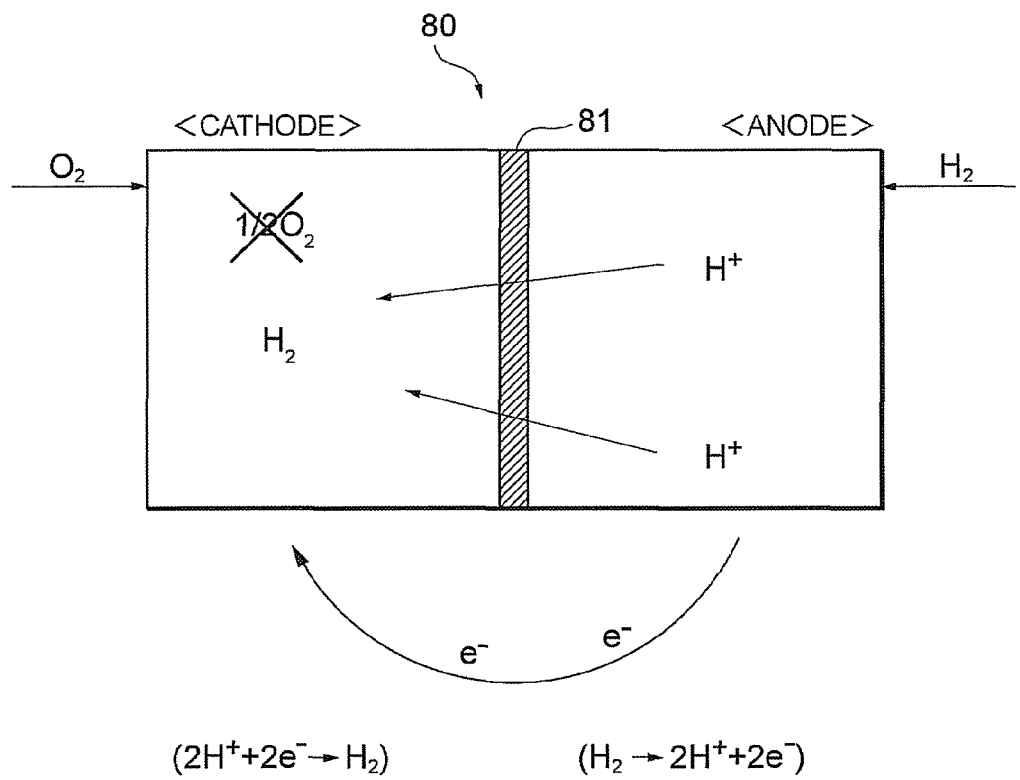

FIGS. 3A and B are diagrams for explaining the generation mechanism of pumping hydrogen, FIG. 3A shows a cell reaction during the nomal operation, and FIG. 3B shows a cell reaction during the low efficiency operation.

Each unitary cell 80 of the fuel cell 2 includes an electrolytic film 81, and an anode and a cathode between which the electrolytic film 81 is sandwiched. The fuel gas including hydrogen ($H_2$) is fed to the anode, and the oxidizing gas including oxygen ($O_2$) is fed to the cathode. When the fuel gas is fed to the anode, the reaction of the following formula (1) proceeds and hydrogen is diverged into hydrogen ions and electrons. The hydrogen ions formed in the anode pass through the electrolytic film 81 to move to the cathode, whereas the electrons pass through an external circuit from the anode to move to the cathode.

$$\text{Anode: } H_2 \rightarrow 2H^+ + 2e^- \qquad (1)$$

Here, in the case of the nomal operation shown in FIG. 3A, that is, when the oxidizing gas is sufficiently fed to the cathode (the air stoichiometric ratio $\geq 1.0$), the reaction of the following formula (2) proceeds and water is formed from oxygen, the hydrogen ions, and the electrons.

$$\text{Cathode: } 2H^+ + 2e^- + (½)O_2 \rightarrow H_2O \qquad (2)$$

On the other hand, in the case of the low efficiency operation shown in FIG. 3B, that is, when the oxidizing gas fed to the cathode runs short (the air stoichiometric ratio <1.0), the reaction of the following formula (3) proceeds in accordance with the amount of the oxidizing gas running short and the hydrogen ions are recombined with the electrons to form hydrogen. Formed hydrogen is discharged together with the oxidizing off gas from the cathode. It is to be noted that hydrogen formed by the recombination of the diverged hydrogen ions and electrons in the cathode, that is, an anode gas formed in the cathode is referred to as pumping hydrogen.

$$\text{Cathode: } 2H^+ + 2e^- \rightarrow H_2 \qquad (3)$$

Thus, when the oxidizing gas fed to the cathode runs short, oxidizing off gas includes pumping hydrogen. To solve the problem, in the case of the low efficiency operation, the controller 7 controls and opens the bypass valve 18 to introduce the bypass air to the oxidizing off gas. The concentration of hydrogen in the oxidizing off gas is diluted by the bypass air, and hence the oxidizing off gas decreased to such an extent that the hydrogen concentration is in a safe range is discharged from the discharge channel 12 to the outside.

The low efficiency operation is performed for a purpose of warming up the fuel cell 2 during startup when, for example, the temperature of the fuel cell 2 or the outside air temperature is a predetermined low temperature (e.g., 0° C. or less). The control of the low efficiency operation will be described in detail. First, the controller 7 determines the target values of the FC current and the FC voltage from the FC output demanded for the fuel cell 2 and the quantity of heat necessary for the warm-up. Then, the controller 7 controls the FC voltage by use of the DC/DC converter 61 to obtain the target value of the FC voltage. At this time, a voltage command value by the DC/DC converter 61 is corrected by the feedback of the value detected by the voltage sensor 10.

On the other hand, the FC current is controlled by the regulator valve 16 during the low efficiency operation. Specifically, the controller 7 first determines the target value of the air stoichiometric ratio from the target values of the FC current and the FC voltage with reference to a low efficiency operation stoichiometric ratio map stored in the ROM. Subsequently, the controller 7 obtains the demanded discharge amount of the oxidizing gas by the compressor 14, the flow rate of the oxidizing gas necessary for the power generation of the fuel cell 2 (hereinafter referred to as "the demanded flow rate of the FC air") and the demanded flow rate of the bypass air necessary for the decrease of the hydrogen concentration, by use of the target value of the air stoichiometric ratio or another map stored in the ROM. Then, the driving of the compressor 14 is controlled in accordance with the demanded discharge amount of the oxidizing gas.

Moreover, the controller 7 determines the open degree instructing values of the regulator valve 16 and the bypass valve 18 from the demanded flow rate of the FC air and the demanded flow rate of the bypass air with reference to another map, to control the regulator valve 16 and the bypass valve 18 in accordance with the open degree instructing value. In consequence, the split flow of the oxidizing gas to the fuel cell 2 and the bypass channel 17 is controlled. At this time, the open degree instructing value of the regulator valve 16 is corrected in accordance with a deviation between the measured value of the FC current detected by the current sensor 9 and the target value of the FC current. That is, the controller 7 feeds back the value detected by the current sensor 9 to the open degree instructing value of the regulator valve 16, whereby the regulator valve 16 is controlled to control the FC current.

It may be judged based on the temperature of the fuel cell 2, the operation time of the low efficiency operation or the like whether or not to end the low efficiency operation, that is, whether or not to end the warm-up operation of the fuel cell 2. Moreover, in a case where it is judged that the warm-up of the fuel cell 2 is completed, the low efficiency operation may shift to the nomal operation. Since any pumping hydrogen is not generated during the nomal operation, the bypass valve 18 may be closed. In the nomal operation, in the same manner as in the low efficiency operation, the FC voltage is controlled by using the DC/DC converter 61, and the FC current is controlled by using the regulator valve 16.

Figure 4:
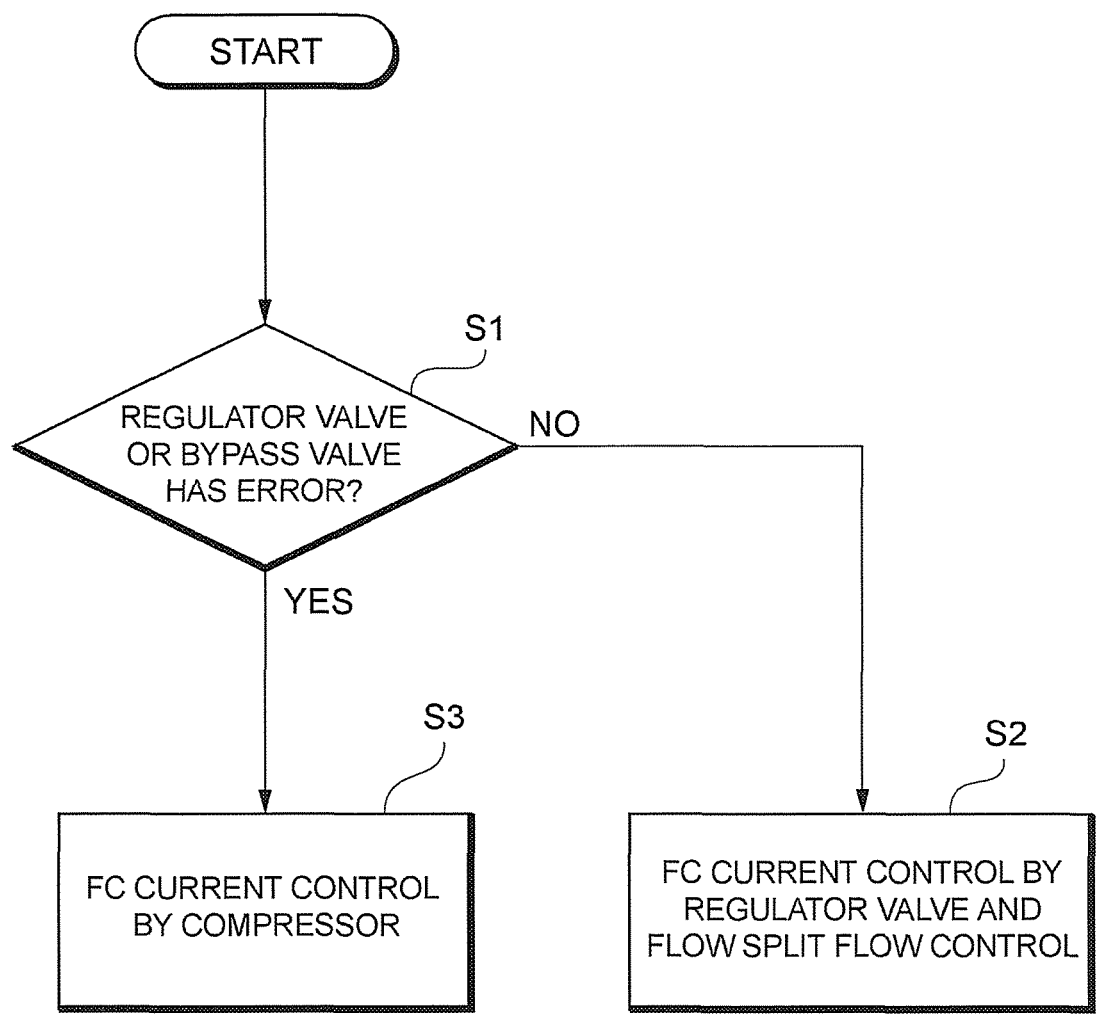
FIG. 4 is a flow chart showing a control method of the FC current during the low efficiency operation of the fuel cell system according to the embodiment.

FIG. 4 is a flow chart showing a control method of the FC current during the low efficiency operation.

As shown in FIG. 4, when both of the regulator valve 16 and the bypass valve 18 are normal (step S1: No), the FC current is controlled by the regulator valve 16 as described above, and the split flow of the oxidizing gas to the fuel cell 2 and the bypass channel 17 is controlled (step S2).

On the other hand, the regulator valve 16 and the bypass valve 18 sometimes do not operate for a reason such as freezing. When such an error occurs in at least one of the regulator valve 16 and the bypass valve 18 (step S1: Yes), the controller 7 controls the FC current by the compressor 14 (step S3). That is, the controller 7 switches the control by the regulator valve 16 as a default function to the control by the compressor 14, to control the FC current. Hereinafter, switching methods at a time when the errors occur in the regulator valve 16 and the bypass valve 18 will successively be described.

FIG. 5 is a timing chart showing the switching method at the time when the error of the regulator valve 16 occurs in an opened state. It is to be noted that when the error of the regulator valve 16 is in the opened state, a valve body of the regulator valve 16 cannot move in a closing direction, and this state is not limited to the fully opened state of the regulator valve 16.

As shown in FIG. 5, when the regulator valve 16 controls the FC current and the error of the regulator valve 16 occurs in the opened state, the FC current starts increasing above the target value (timing $t_1$). This is because the flow rate of the oxidizing gas to the fuel cell 2 increases. When the increased FC current is detected by the current sensor 9 and a current deviation is fed back to the open degree instructing value of the regulator valve 16, the open degree instructing value of the regulator valve 16 has a closing direction (e.g., an open degree of 0%) (timing $t_1 \rightarrow t_2$). In consequence, it is intended that the flow rate of the oxidizing gas to the fuel cell 2 decreases and that the flow rate of the bypass air increases. However, since the opened erroneous regulator valve 16 does not operate, the amount of the bypass air does not increase, and the increase of the FC current is not suppressed (the timing $t_1 \rightarrow t_2$).

When the increased FC current exceeds a current threshold value, the controller 7 judges that the regulator valve 16 has the error in the opened state (the timing $t_2$). After this judgment, the controller 7 starts switch processing. In the switch processing, first the driving of the motor 14a of the compressor 14 is stopped (the timing $t_2$). When the driving of the compressor 14 shifts to the stop side, the feed of the oxidizing gas is blocked, and hence the FC current starts lowering (timing $t_2 \rightarrow t_3$). Subsequently, after the compressor 14 stops, the FC current falls below the target value (the timing $t_3$). At this time, the current deviation is fed back to the open degree instructing value of the regulator valve 16, and the open degree instructing value of the regulator valve 16 indicates an opening direction (the timing $t_3$). This is because the controller 7 opens the regulator valve 16 to increase the flow rate of the oxidizing gas to the fuel cell 2. However, since the opened erroneous regulator valve 16 does not operate, the FC current continues lowering, and the open degree instructing value of the regulator valve 16 also starts rising to an open degree of 100% (timing $t_3 \rightarrow t_4$).

When the raised open degree instructing value of the regulator valve 16 exceeds a threshold value (e.g., an open degree of 80%), the controller 7 starts the motor 14a to resume the driving of the compressor 14 (the timing $t_4$). In consequence, the lowered FC current can be raised toward the target value (timing $t_4 \rightarrow t_5$). Moreover, when the open degree instructing value of the regulator valve 16 reaches an open degree of 100% (the timing $t_5$), the controller 7 ends the switch processing, and starts the control of the FC current by the control of the rotation number of the motor 14a, so that the FC current reaches the target value. It is to be noted that the controller 7 may correct even the command value of the rotation number of the motor 14*a* by use of the current deviation (a difference between the value of the FC current detected by the current sensor 9 and the target value).

Next, the switching method at the time when the error of the bypass valve 18 occurs in a closed state will be described with reference to FIG. 6. It is to be noted that when the error of the bypass valve 18 is in the closed state, a valve body of the bypass valve 18 cannot move in an opening direction, and this state is not limited to the fully closed state of the bypass valve 18.

As shown in FIG. 6, when the regulator valve 16 controls the FC current and the error of the bypass valve 18 occurs in the closed state, the FC current starts increasing above the target value (timing $t_1$). This is because the flow rate of the oxidizing gas to the fuel cell 2 increases. Then, the current deviation is fed back to the open degree instructing value of the regulator valve 16 in the same manner as described above, to achieve the closing direction (e.g., an open degree of 0%) (timing $t_1 \rightarrow t_2$). However, since the closed erroneous bypass valve 18 does not operate, the FC current increases, and the discharge pressure of the compressor 14 rises (the timing $t_1 \rightarrow t_2$). The discharge pressure is detected by the pressure sensor P1 as described above.

When the raised discharge pressure value exceeds a pressure threshold value, the controller 7 judges that the bypass valve 18 has the error in the closed state (the timing $t_2$). Here, the reason why the detection of the error of the bypass valve 18 by use of the pressure sensor P1 is adopted is that the method becomes the same as the error detection method of the regulator valve 16 and it is difficult to precisely judge whether the error occurs in the regulator valve 16 or the bypass valve 18 even if the current sensor 9 is used. In the present embodiment, the error of the bypass valve 18 is detected by using the pressure sensor P1, and the error of the regulator valve 16 is detected by using the current sensor 9, so that the detection of the errors of both the valves is precisely judged. The sensor is selected in this manner in view of a situation that in a case where the bypass valve 18 has the error in the closed state (the case of FIG. 6), as compared with a case where the regulator valve 16 has the error in the opened state (the case of FIG. 5), the rise ratio of the FC current is minimized, whereas the rise ratio of the discharge pressure increases.

In a case where the controller 7 judges that the bypass valve 18 has the error in the closed state, the controller starts the switch processing, and stops the driving of the motor 14*a* of the compressor 14 (the timing $t_2$). Then, the discharge pressure and the FC current start lowering (timing $t_2 \rightarrow t_3$). When the FC current falls below the target value (the timing $t_3$), the current deviation is fed back to the open degree instructing value of the regulator valve 16 in the same manner as described above, and the opening direction is achieved (after the timing $t_3$). Moreover, when the open degree instructing value of the regulator valve 16 continues rising to an open degree of 100% (timing $t_3 \rightarrow t_4$) and the raised open degree instructing value of the regulator valve 16 exceeds a threshold value (e.g., an open degree of 80%), the controller 7 starts the motor 14*a* to resume the driving of the compressor 14 (the timing $t_4$).

Afterward, when the open degree instructing value of the regulator valve 16 reaches an open degree of 100% (the timing $t_5$), the controller 7 starts the control of the FC current by the control of the rotation number of the motor 14*a*. In consequence, the switch processing is completed. Afterward, the FC current reaches the target value. It is to be noted that the controller 7 may correct even the command value of the rotation number of the motor 14*a* by use of the current deviation (the difference between the value of the FC current detected by the current sensor 9 and the target value).

As described above, according to the present embodiment, even when the error occurs in the regulator valve 16 or the bypass valve 18 during the low efficiency operation, an operation device for controlling the FC current is switched to the compressor 14. Therefore, the FC current can continuously be controlled, and the low efficiency operation can be maintained. Moreover, during the switch control to the compressor 14, the compressor 14 is once stopped and then driven. In consequence, the FC current, FC air flow rate, and discharge pressure which have been increased due to the occurrence of the error can be decreased. Therefore, the control can smoothly be switched to the subsequent control of the FC current by the compressor 14. Furthermore, the open degree instructing value of the regulator valve 16 subjected to the feedback control can be used as a trigger to resume the driving of the compressor 14. On the other hand, when the regulator valve 16 and the bypass valve 18 are normal during the low efficiency operation, the bypass air flow rate and the FC air flow rate can appropriately be subjected to the split flow control by these valves, and additionally the FC current can be controlled by the valves.

Modification

In a case where it is judged that a regulator valve 16 and a bypass valve 18 have errors (timing $t_2$ of FIGS. 5 and 6), instead of once stopping a compressor 14, the compressor may be driven in a stop direction. In short, the discharge amount of an oxidizing gas by the compressor 14 may be decreased to lower an FC current.

The switch from the control of the FC current by the regulator valve 16 to the control of the FC current by the compressor 14 shown in, for example, FIGS. 5 and 6 may be executed during not only a low efficiency operation but also a nomal operation.

The bypass valve 18 is not limited to a case where the valve is provided in a bypass channel 17, and may be provided at a connecting portion B. In this case, the bypass valve 18 may be constituted of a rotary valve.

The invention claimed is:

1. A fuel cell system, comprising:
   a fuel cell;
   a feed channel through which oxidizing gas to be fed to the fuel cell flows;
   a feed device provided in the feed channel to feed the oxidizing gas under pressure to the fuel cell;
   a discharge channel through which oxidizing off gas discharged from the fuel cell flows;
   a bypass channel which connects the feed channel to the discharge channel so that the oxidizing gas flows while bypassing the fuel cell;
   a split flow adjustment device that is configured to adjust a split flow of the oxidizing gas to the bypass channel and the fuel cell; and
   a controller which controls the feed device and the split flow adjustment device,
   wherein the controller is configured to switch a control of the output current of the fuel cell from a control by the split flow adjustment device to a control by the feed device, when the split flow adjustment device has an error during a low efficiency operation having a power loss larger than that of a normal operation.

2. The fuel cell system according to claim 1, wherein the split flow adjustment device prohibits the split flow of the oxidizing gas to the bypass channel during the normal operation, and adjusts the flow rate of the oxidizing gas to be split to the bypass channel during the low efficiency operation.

3. The fuel cell system according to claim 1, wherein the split flow adjustment device has:
   a regulator valve which adjusts the feed pressure of the oxidizing gas to the fuel cell; and
   a bypass valve which adjusts the flow rate of the oxidizing gas to be split to the downstream side of the bypass channel, and
   the controller switches the control of the output current of the fuel cell from a control by the regulator valve to the control by the feed device, when an error occurs in at least one of the regulator valve and the bypass valve during the low efficiency operation.

4. The fuel cell system according to claim 3, wherein the controller once stops the feed device and then drives the feed device, when switching to the control by the feed device.

5. The fuel cell system according to claim 4, further comprising:
   a current sensor which detects the output current of the fuel cell,
   wherein when a value detected by the current sensor exceeds a threshold value, the controller judges that the error of the regulator valve occurs in an opened state, to once stop the feed device.

6. The fuel cell system according to claim 5, wherein the controller performs control by the feedback of the value detected by the current sensor to an open degree instructing value of the regulator valve, and the controller starts driving the once stopped feed device, when the open degree instructing value of the regulator valve exceeds a threshold value.

7. The fuel cell system according to claim 4, further comprising:
   a pressure sensor which detects a discharge pressure of the oxidizing gas from the feed device,
   wherein, when a value detected by the pressure sensor exceeds a threshold value, the controller judges that an error of the bypass valve occurred in a closed state, and once stops the feed device.

8. The fuel cell system according to claim 7, further comprising:
   a current sensor which detects the output current of the fuel cell,
   wherein the controller performs control by the feedback of a value detected by the current sensor to an open degree instructing value of the regulator valve, and
   the controller starts the driving of the once stopped feed device, when the open degree instructing value of the regulator valve exceeds a threshold value.

9. The fuel cell system according to claim 3, wherein the controller judges by use of different sensors whether the error occurs in the regulator valve or the bypass valve.

10. The fuel cell system according to claim 3, wherein the regulator valve is provided in the discharge channel, and the bypass valve is provided in the bypass channel.

* * * * *